United States Patent [19]

Taub

[11] Patent Number: 5,653,776
[45] Date of Patent: Aug. 5, 1997

[54] APPARATUS FOR DE-ENTRAINING LIQUID IN GAS SCRUBBERS AND THE LIKE

[75] Inventor: David B. Taub, Guilford, Conn.

[73] Assignee: Entoleter, Inc., Hamden, Conn.

[21] Appl. No.: 499,017

[22] Filed: Jul. 6, 1995

[51] Int. Cl.$^6$ .................................... B01D 45/16
[52] U.S. Cl. ................ 55/237; 55/257.1; 55/257.4; 55/257.5; 261/79.2
[58] Field of Search ................ 55/257.1, 257.5, 55/257.4, 235–239, 462, 465; 261/79.2; 422/168

[56] References Cited

U.S. PATENT DOCUMENTS

| | | | |
|---|---|---|---|
| Re. 28,616 | 11/1975 | Yankura | 261/79.2 X |
| 2,354,676 | 8/1944 | Fisher | 261/79.2 X |
| 2,392,705 | 1/1946 | Smith et al. | 261/79.2 |
| 2,409,088 | 10/1946 | Weits et al. | 261/79.2 X |
| 2,882,996 | 4/1959 | Lanier et al. | 55/257.1 |
| 3,315,444 | 4/1967 | De Seversky | 55/257.1 X |
| 3,566,582 | 3/1971 | Yankura | 261/79.2 X |
| 3,618,299 | 11/1971 | Vincent | 261/79.2 X |
| 4,008,056 | 2/1977 | Potter | 261/79.2 X |
| 4,157,368 | 6/1979 | Fernandes | 261/79.2 X |
| 5,283,048 | 2/1994 | Martin et al. | 422/168 |

Primary Examiner—Richard L. Chiesa
Attorney, Agent, or Firm—Louis Weinstein

[57] ABSTRACT

Apparatus for scrubbing a gas in which a vortical flow of a gas and liquid mixture created by an entrainer is introduced into a de-entrainer through a guide/deflector assembly. Particulate is removed from the gas and picked up by the liquid during entrainment. De-entrainment separates the liquid from the gas and delivers the scrubbed gas to an outlet. A conical top provided upon the primary de-entrainer prevents water droplets, which also contain particulate from being re-entrained with the scrubbed gas and further serves to deflect the droplet toward the sides of the de-entrainer where they may be collected, filtered and returned to the entrainer, thereby significantly increasing contaminant removal from the gas stream. Anti-spin plates are provides at spaced angular interval just upstream of the scrubbed gas outlet which break the vortex of air formed by the primary de-entrainer which serves to remove additional droplets and water vapor by mechanical condensation and agglomeration increasing efficiency of contaminant removal and further reducing the pressure drop required to move air out of the scrubber and into the atmosphere. The reduced pressure drop makes more effective use of the pressure in the dirty gas region thus further improving efficiency.

10 Claims, 5 Drawing Sheets

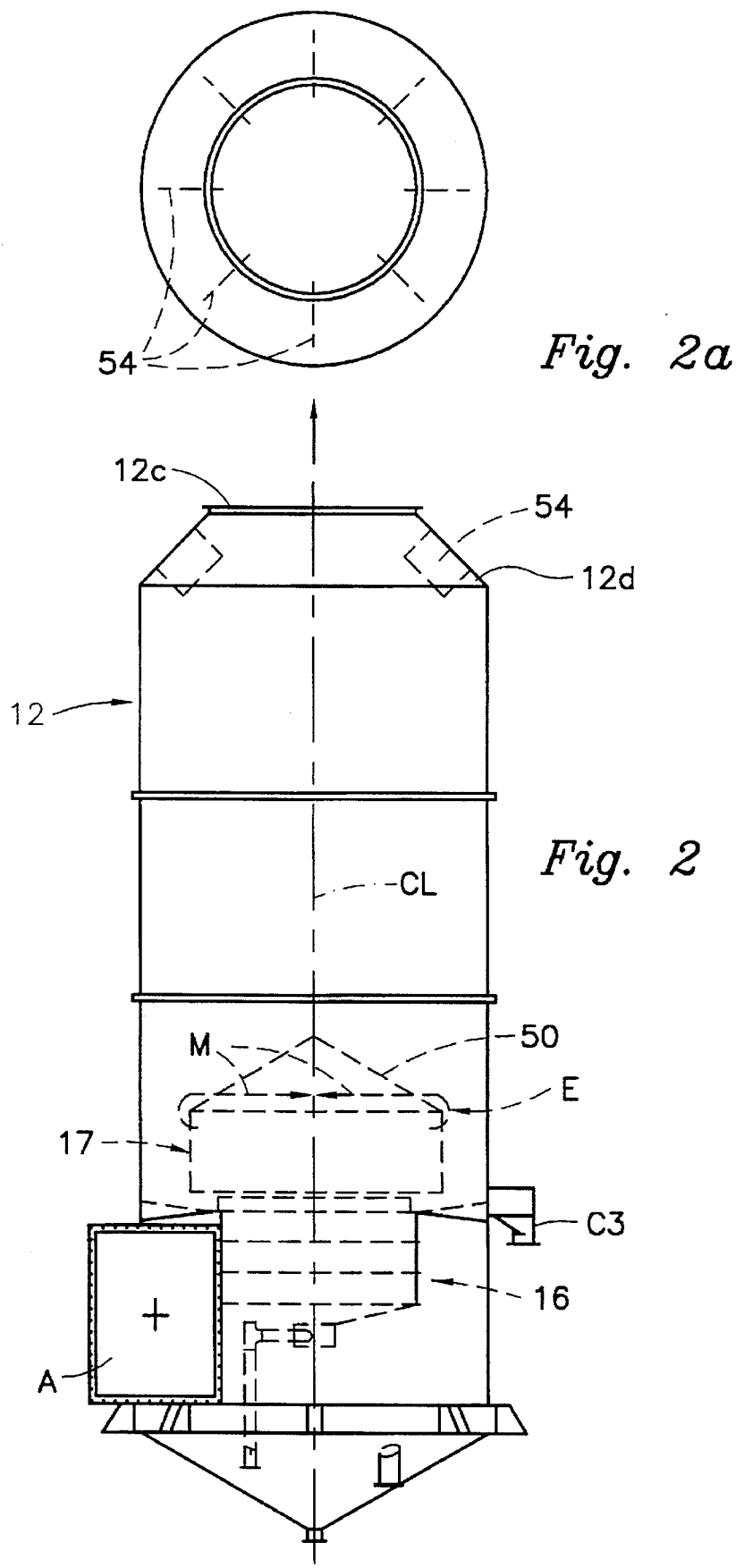

APPARATUS FOR DE-ENTRAINING LIQUID IN GAS SCRUBBERS AND THE LIKE

FIELD OF THE INVENTION

The present invention relates to the field of mass contact between two or more media utilizing entrainer/de-entrainer devices, typically referred to as scrubber apparatus, and more particularly, to a novel means for significantly enhancing the efficiency of the entrainer and de-entrainer and hence the mass contact system, by providing a deflecting cone which prevents drops from migrating to the center of the de-entrainer and alternatively delivers the drops to the outer perimeter of the de-entrainer for collection and filtering and further by providing anti-spin plates just upstream of the scrubbed air outlet which decreases the pressure drop in the region of the deflector plates to thereby utilize the pressure drop more efficiently in the entrainment area.

BACKGROUND OF THE INVENTION

The present invention relates to the field of mass contact between at least two media and which may be used for a number of purposes such as the transfer of material, physical or chemical energy from one media to the next, such as, for example, the scrubbing of particulate from air by contact with water; humidifying a gas such as air by contact with water; distillation of volatile components of a liquid by contact with gas; heating or cooling a gas by contact with a warmer or cooler liquid and chemically reacting components contained in the two media.

There exists a number of other applications in which mass contact between media may be employed and it is contemplated that the present invention applies to all of such applications where mass contact between two or more media is desired.

Although the present invention will be described herein primarily making reference to mass contact between a liquid and a gas, such as water and air, for scrubbing, humidifying and/or cooling the air, it should be understood that the invention is not limited thereto.

The conventional approach to mass contact is to provide a vortical flow of gas in a chamber, suspend particles of liquid in the flow of gas and thereafter separate the liquid from the gas. Particulate carried by the gas can be taken up by the liquid to purify, i.e. "scrub", the gas. In addition, gaseous components soluble in the liquid can likewise be removed from the gas medium and the gas can be cooled by the liquid medium and/or humidified if the liquid is water. The present invention relates to such vortical flow type mass contact devices and more particularly, to mass contact devices employing entrainer/de-entrainer apparatus.

In U.S. Pat. No. 3,566,582, issued Mar. 2, 1971, reissued as U.S. Pat. No. Re. 28,616 on Nov. 18, 1975 and assigned to the assignee of the present invention, there is described a mass contact device in which vortical gas flow is established by forcing a gas, such as air, through a louvered chamber, typically referred to as an annular vane cage, the vanes or louvers being oriented so that air or other gas entering the chamber in the open region or slots between the louvers has a directional flow imparted thereto, which directional flow has both radially inward and tangential directional vector components. The gas is thus caused to circulate about the interior of the chamber and ultimately exits through an axial opening at one of the chambers, a vortical gas flow pattern thereby being established.

Liquid, such as water is drawn into the vortical gas flow which picks up the liquid and acts upon the liquid, creating a cloud-like suspension of liquid droplets throughout the vortical flow pattern. The droplets circulate with the gas and are concentrated in an annular zone inward from the louvered chamber.

The droplets are acted upon by the centrifugal force of the radially inwardly directed component of gas flow, drawing the droplets inwardly of the vortex and ultimately out through the axial outlet opening of the vane cage and a centrifugal force created by the tangential component of the gas flow as well as the mass of the droplets which tend to cause the droplets to migrate outwardly of the vortex and toward the louvered wall. These effects cause a constant inward and outward migration of droplets within the suspended cloud, the migration being a function of droplet size.

The major influence on large droplets is the centrifugal force which causes large droplets to move outwardly and either strike inwardly moving droplets or the vane cage breaking up the droplets into droplets of smaller size. Droplets of smaller size and mass are principally influenced by the centripetal force vector of the vortical air flow. The droplets making up the cloud within the vane cage constantly change in the manner described wherein the proportion of inward and outward migration is a function of operational parameters which include the feed rate of the gas or air through the system, its pressure drop, the angle of the vanes and the dimension of the louvered chamber.

The scrubber vane cages are designed to provide optimum efficiency at a given air flow rating. The desired pressure drop of an entrainer vane cage and a de-entrainer vane cage for a given air flow rating is determined by the annular area of the vane cage which is a function of height and diameter.

Heretofore the accepted design approach was to make the vane cage substantially square in profile, i.e. the height of the vane cage is substantially equal to the diameter. Although the design approach provides optimum efficiency at the desired air flow rate, the efficiency drops considerably as the air flow rate deviates from the desired flow rate in both a positive (greater flow rate) or negative (smaller flow rate) direction, rendering conventional mass contact systems incapable of providing efficient operation over a broad air flow range.

The air vortex in the entrainment vane cage spirals upwardly through a central guide and exits through slots between the spaced apart vanes of a de-entrainment vane cage which imparts an expanding spiral impetus to the air as it leaves the de-entrainment vane cage and enters into an expansion chamber for ultimate egress from the de-entrainer tank.

The cloud moving from the entrainer to the de-entrainer includes water droplets together with air, the water droplets in the scrubber application carrying the particulate which is desired to be removed from the air.

Both large and small water droplets are transferred from the entrainer to the de-entrainer.

The air leaving the de-entrainer vane cage swirls upwardly and egresses from the top of the de-entrainer tank whereas the water strikes the interior wall of the de-entrainment tank and eventually falls to the bottom of the de-entrainer tank where it is collected for filtration and is returned to the entrainer. The air which has been rid of the undesirable particulate is then safely returned to the atmosphere or a utilization device for reuse. However, a significant amount of water passes through the outlet of the scrubber with the air which is disadvantageous.

The large amount of liquid introduced into the de-entrainer thus significantly reduces scrubber efficiency.

Scrubber efficiency was significantly improved through the scrubber design disclosed in U.S. Pat. No. 5,283,048 issued Feb. 1, 1994 and assigned to the assignee of the present application, which patent discloses the employment of deflector means for significantly enhancing the efficiency of the entrainer and de-entrainer by collecting most of the water droplets of greater mass travelling from the entrainer toward the de-entrainer and deflecting the droplets downwardly and away from the de-entrainer and toward a collection region. In addition, U.S. Pat. No. 5,283,048 has utilized a vane cage whose height to diameter ratio is in the range between ¼ and ¹⁄₁₀, i.e. the diameter of vane cage being four to ten times greater than the height, which design substantially doubles the percentage of deviation from the given rating before a drop in efficiency occurred in the scrubbed.

Nevertheless, a significant amount of water vapor has been found to escape through the outlet for the scrubbed gas, thus reducing efficiency of the scrubber as well as increasing the amount of particulate in the scrubbed gas, which particulate is carried by the escaping vapor.

BRIEF DESCRIPTION OF THE INVENTION

The present invention is characterized by comprising a scrubber having entrainment/de-entrainment means and a cone-shaped deflector means arranged upon the top of the primary de-entrainer for preventing droplets which would otherwise flip over the upper, outside edge of the de-entrainer and migrate to the de-entrainer top where they may be re-entrained in the gas leaving the scrubber. The base angle of the conical-shaped deflector provided atop the primary de-entrainer is preferably between 10 and 40 degrees to cause droplets attempting to move inwardly to be deflected downwardly and outwardly along the surface of the conical-shaped deflector and toward the outer perimeter of the scrubber where the drops are collected and filtered to remove particulate before reuse.

The scrubber is further provided with a plurality of angularly spaced, anti-spin plates arranged slightly upstream of the scrubber air outlet for reducing the pressure drop required to move air out of the scrubber and into the atmosphere thereby increasing the pressure in the entrainment area which serves to increase scrubbing efficiency. The plates further provide for mechanical condensation and agglomeration of the water vapor enabling the droplets and water vapor to be condensed in a low velocity area providing less chance for the drops to be entrained in the air and carried out of the scrubber stack.

OBJECTS OF THE INVENTION

It is therefore one object of the present invention to provide a mass contact apparatus such as, for example, a scrubber in which scrubbing capacity and efficiency is significantly improved through the employment of a deflecting cone provided upon the primary de-entrainer for deflecting droplets away from a central area of the primary de-entrainer, thereby preventing the droplets from being re-entrained with the scrubbed air.

Still another object of the present invention is to provide a novel mass contact apparatus such as, for example, a scrubber utilizing anti-spin plates provided downstream of the scrubbed air outlet of the scrubber stack to substantially prevent water vapor from passing through the aforesaid outlet and recombining with the scrubbed air and further to increase the pressure drop in the entrainment area thereby significantly improving entrainment efficiency.

BRIEF DESCRIPTION OF THE FIGURES

FIG. 2 shows an enlarged detailed elevational view of the apparatus of FIG. 1 showing the location of the entrainment and de-entrainment assemblies;

FIG. 2a shows a top plan view of the arrangement of FIG. 2;

FIG. 4b is an elevational view of a portion of the de-entrainment assembly of FIG. 4a; and FIG. 4c shows an enlarged detailed view of the de-entrainment assembly of FIG. 4a and incorporation droplet deflectors and is a view looking in the direction of arrows 4c—4c of FIG. 4a.

DETAILED DESCRIPTION OF THE INVENTION

Figure 1:
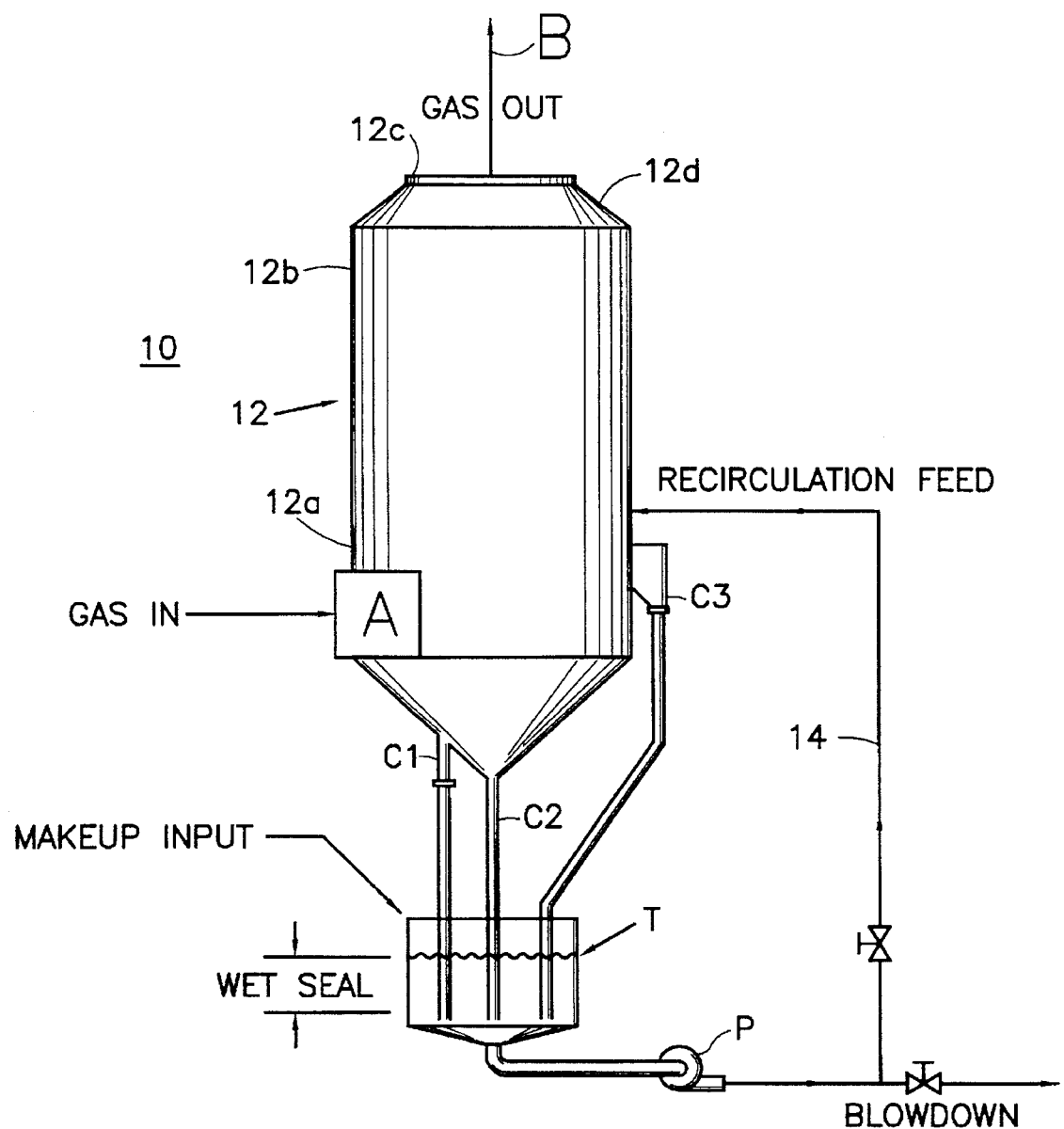
FIG. 1 shows a simplified diagram of a scrubber in which the deflection means and anti-spin means of the present invention may be used to great advantage.

FIG. 1 Shows a mass contact apparatus 10 in which the deflector means of the present invention may be used to great advantage. The mass contact assembly 10 which may, for example, be a scrubber, is comprised of a tank 12 having a lower cylindrical portion 12a which houses the entrainment assembly (to be more fully described). Inlet A receives air or another gas which may, for example, be laden with undesirable particulate. The gas is drawn or blown into tank 12 by means of a suitable blower (not shown) preferably outside of the scrubber, the direction of gas flow being shown by arrow B. Liquid, such as water, is introduced into the entrainment vane cage, to be more fully described, by conduit 14, for example. Liquid delivered to collection tank T from conduits C1, C2 and C3 is returned to scrubber 10 through conduit 14 by pump P, preferably after being filtered (by means not shown). Makeup liquid is introduced into tank T whenever necessary. The liquid may be introduced into the entrainment vane cage 16 in any of the locations shown, for example, in the reissue U.S. Pat. No. Re. 28,616.

FIG. 2 shows an enlarged detail view of scrubber 10 showing the entrainment vane cage 16 and the de-entrainment vane cage 17. FIG. 2a is a top view of the scrubber 10.

The entrainment vane cage 16, typically is provided with a number of vanes in the range of from 9 to 120.

Figure 3A:
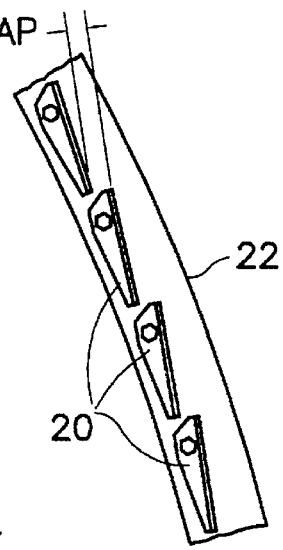
FIG. 3a shows a top elevational view, partially sectionalized, of the entrainment assembly of FIG. 2.
Figure 3:
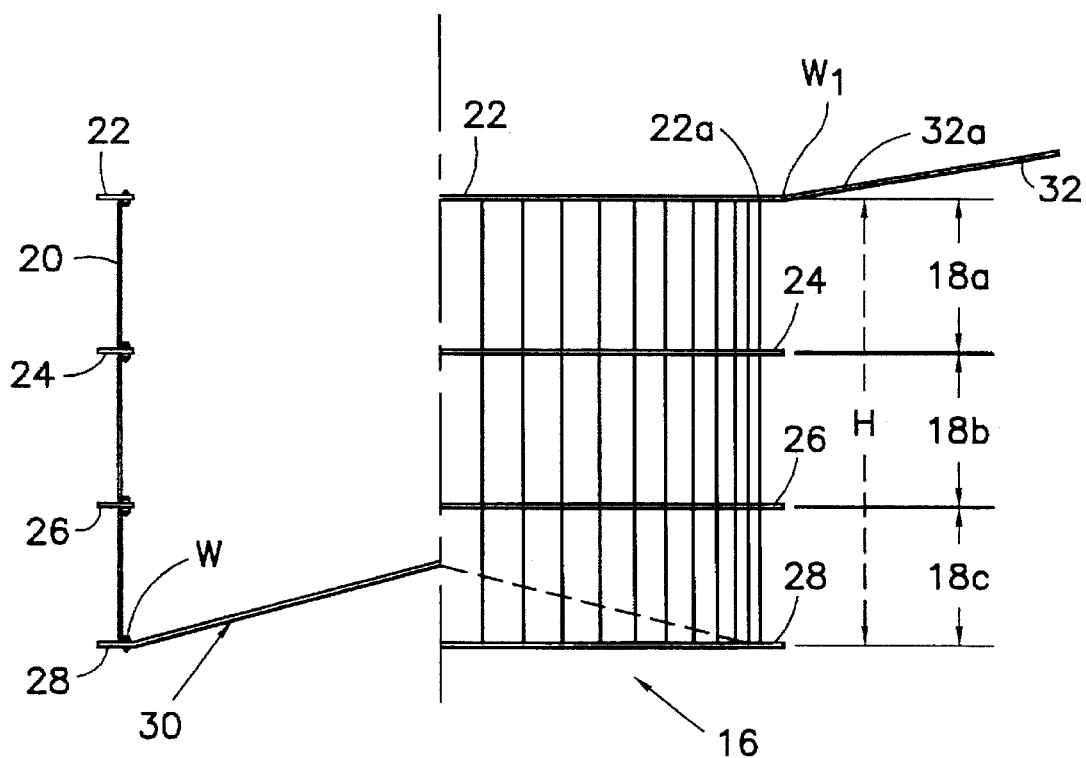
FIG. 3 shows an elevational view, partially sectionalized, of the entrainment assembly vane cage of FIG. 2.

FIGS. 3 and 3a show a detailed view of a portion of the entrainment vane cage assembly 16 comprised of three rows 18a, 18b and 18c of vanes 20, a partial top view being shown, for example, in FIG. 3a. The top row of vanes 18a are arranged between a top mounting ring 22 and an upper intermediate mounting ring 24. The second row 18b of vanes 20 are arranged between upper intermediate mounting ring 24 and lower intermediate mounting ring 26 while the bottom row 18c of vanes 20 is arranged between lower intermediate mounting ring 26 and bottom mounting ring 28. Further details of vane cage 16 are set forth in U.S. Pat. No. 5,283,048 which is incorporated hereby by reference thereto.

The top array of vanes 20 are secured between a pair of rings, such as 22 and 24, by threaded bolts and threaded nuts which are threadedly engaged.

The individual vanes 20 are adjustable about their respective mounting bolts to assure optimum performance.

The height H of the vane cage 16 relative to the diameter D is selected so that $$\frac{D}{10} \leq H \leq \frac{D}{4}$$

This relationship enables the scrubber, which is preferably designed for a given air flow rating, to provide efficient operation over an operating range which at the upper and lower ends is approximately twice the percentage deviation from the desired rating of conventional scrubbers using vane cages whose height to diameter relationship is typically $$\frac{H}{D} = \frac{1}{1}$$

The inlet (or outlet) surface area of the vane cage is selected to obtain the desired pressure drop for a given air flow rating. The configuration of the surface area, i.e. its height and radius of curvature is then selected by using the height to diameter relationship set forth above, with the result that a scrubber using such vane cage design operates efficiently over a substantially greater range of air flow rate than vane cages employing a height to diameter relationship of $$\frac{H}{D} = \frac{1}{1}$$

For example, the efficiency of the scrubber employing conventional vane cages may drop considerably when the air flow rate deviates about 7% from the designed rate. Employing the design of the present invention, the percent deviation from the desired rate is about double that employing a conventional vane cage.

A cone-shaped member 30 has its outer periphery 30a welded to the inner periphery of bottom ring 28 as shown by weldment W in FIG. 3a, cone 30 extending upwardly into the vane cage 18 in the manner shown best in FIG. 3. As was mentioned hereinabove, each of the three rows 18a, 18b and 18c preferably contain 66 vanes, the total height of the vane cage being of the order of 38 inches, in one preferred embodiment.

The outer periphery 22a of upper ring 22 is welded to the inner periphery 32a of truncated, conical-shaped contactor roof 32 as shown by the weldment $W_1$.

Figure 4A:
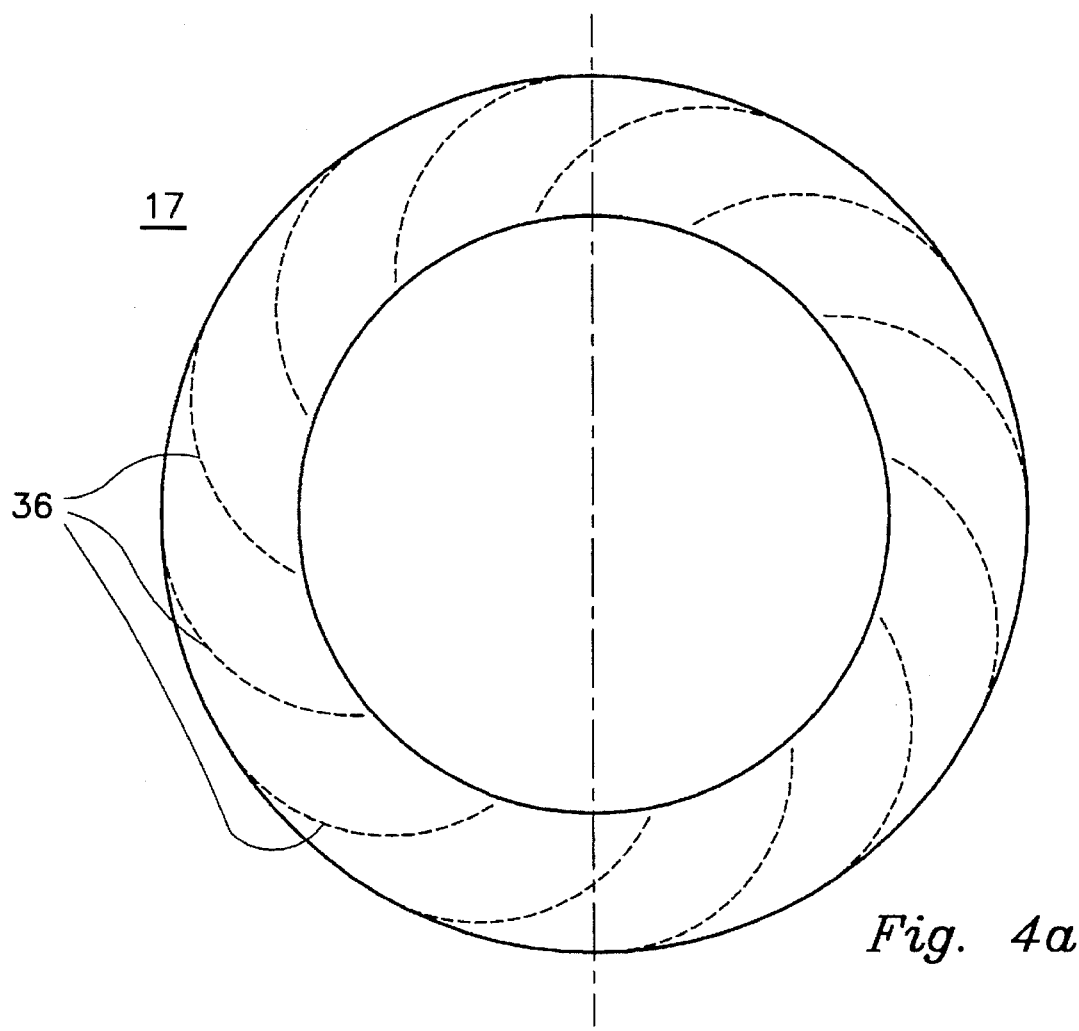
FIG. 4a is a top plan view of the de-entrainment assembly shown in FIG. 2.
Figure 4B:
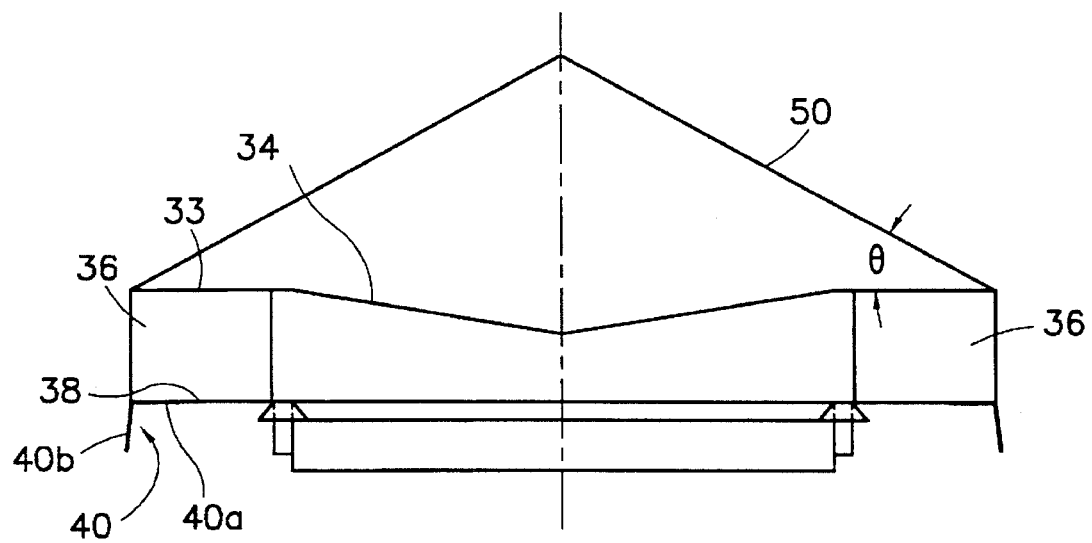
Figure 4C:
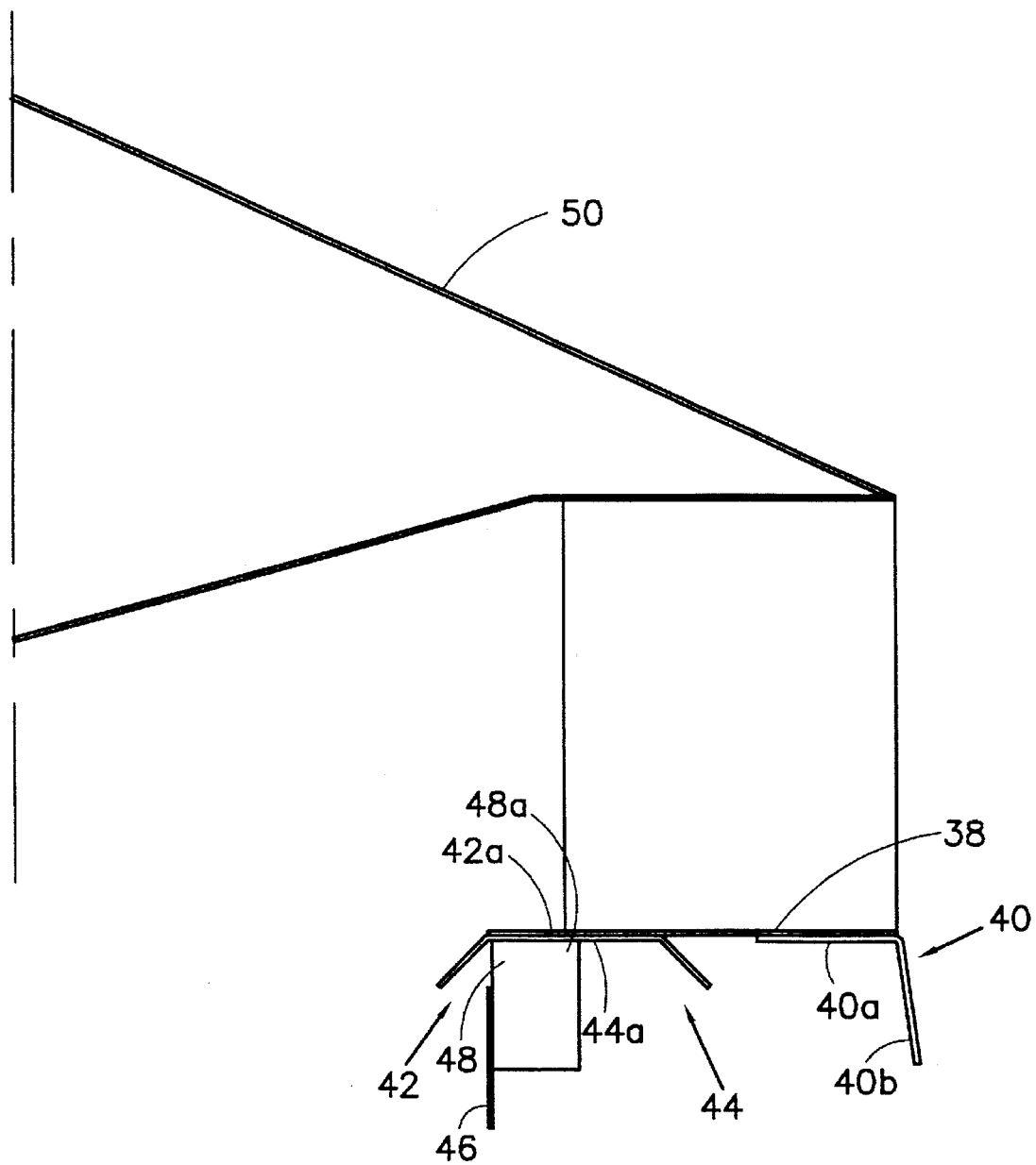

FIGS. 4a, 4b, and 4c respectively show top plan, side elevational and sectional views of the de-entrainer assembly 17 comprised of a top ring 33 whose inner periphery 33a is welded to the outer periphery 34a of an inverted cone-shaped member 34. A plurality of curved blades 36 are arranged at equi-spaced intervals about the de-entrainment vane cage 17. A ring 38 and ring 33 are arranged in spaced parallel fashion and respectively engage the undersides and topsides of blades 36, the blades being secured to rings 33 and 38. A plurality of substantially L-shaped supporting braces 40, having an arm 40a welded to the underside of ring 38 and a leg 40b supported upon the surface of the contactor roof 32 are shown also in FIG. 2. The contactor roof 32 extends radially outwardly and joins the portion 12b of cylindrical tank housing 12 as shown in dotted line fashion in FIG. 2.

A 45 degree truncated cone-shaped ring or deflector ring 42 has its outer diameter end 42a welded to the underside of ring 38. A second 45 degree truncated cone-shaped deflector ring 44 has its inner periphery 44a welded to the inner periphery of ring 38. A cylindrical guide member 46 has its upper end welded to the lower end of a plurality of metallic segments or tie-bars 48 arranged at equi-spaced intervals about the outer periphery of cylinder 46. In one preferred embodiment, eight such tie-bars are provided, spaced, for example, at 45 degree intervals about the periphery of cylinder 46. The top surfaces 48a of tie-bars 48 are welded to the underside of ring 38. The bottom end 46a of cylinder 46 is secured to the top surface of the topmost ring 22 of the entrainer vane cage 18 and near the inner periphery of ring 22. Top ring 22 is shown in schematic fashion in FIG. 4b.

A conical-shaped deflector 50 is positioned upon the top ring 33 and is provided with an angle θ in the range from 20° to 40° for the purpose of preventing migration of droplets toward the central axis of tank 12, as will be more fully described hereinbelow.

In addition, a plurality of anti-spin plates 54 are arranged at spaced intervals in the manner shown in FIGS. 2 and 2a to further improve contaminant removal efficiency of the scrubber, as will be more fully described. Plates 54 are arranged at 45° intervals about a truncated conical portion 12d of tank 12. Plates 54 extend radially inward and have a substantially rectangular shape. If desired, a greater or lesser number of plates 54 may be employed.

The operation of the present invention is as follows:

The blower (or suction device), which has been omitted from the Figures for purposes of simplicity, draws air through outlet opening 12c in the tank 12 creating an air flow which draws air inwardly through inlet A shown in FIGS. 1 and 2. The air moves around vane rows 18 and is ultimately drawn into the region surrounded by the vane rows 18. The air passes through the spaces between adjacent vanes which direct the flow of air. Water is introduced through a pipe (which is coupled to line 14 shown in FIGS. 1 and 2) whereby mass contact between the gas (i.e. air) and liquid (i.e. water) occurs both outside of and within the interior of the entrainer assembly vane cage 16. The arrangement of the vanes creates an inward vortical air flow of both the air and the water principally in the region surrounded by vane rows 18.

As was described hereinabove, a constant inward and outward movement of water droplets occurs such that smaller droplets move inwardly due to the influence of the vortical air flow while droplets of larger size (and mass) move outwardly toward the periphery of the vane cage due to the principal influence of the centrifugal force. Some droplets leave the vane cage through slots (not shown) provided in the vanes and later return to the vortical flow by passing between adjacent vanes. Large droplets strike other droplets and/or the vane cage and break into smaller droplets. Smaller droplets agglomerate and move outwardly due to the centrifugal force. This inward and outward flow continues throughout the operation of the mass contact assembly assuring the desired intimate mass contact between gas and liquid.

The liquid droplets pick up particulate from the vortical flow, thus cleaning or "scrubbing" the gas. The vortical flow of gas and liquid droplets moves upwardly through the top end of the entrainment assembly 16 and into guide cylinder 46. Most of the liquid droplets are urged against the inner periphery of cylinder 46 and move upwardly as they swirl around where they engage the undersurface of the deflector ring 44, passing out through the gap region between the top edge of cylinder 46 and the bottom surfaces of deflector 44 and ring 38. Deflector ring 42 ultimately deflects the exiting droplets downwardly into a collection pool.

The upward vortical flow of air and finer droplets which consists primarily of wisps of liquid, pass through the opening defined by the inner periphery of ring 42 and ultimately pass outwardly through the de-entrainment vane cage 17. The flow passing through the exiting spaces of the de-entrainment vane cage 17, which is comprised of the open region between adjacent curved vane blades 36, causes an outward vortical flow. The fine wisps of water passing out of the de-entrainment vane cage 17 are urged outwardly and against the inner periphery of the tank 12b and downwardly therealong due to their mass, whereas the gas (air or the like) moves substantially upwardly in a vortical path due to its significantly lower mass. The heavier droplets striking the inner periphery of the tank then move downwardly along the interior of tank 12 wherein the water is ultimately collected near the bottom of the tank while the air continues its upward vortical flow and ultimately passes outwardly through opening 12c at the top of the tank to safely enter into the atmosphere or into an output utilization device.

By diverting most of the droplets, especially the larger size droplets, away from the de-entrainment assembly 17, the larger mass of the droplets and the slower flow rate of the droplets, due to their larger size and mass is diverted away from the de-entrainment cage and hence the capacity and the flow rate of the air and fine wisps of water exiting from the vane cage is significantly increased thereby greatly increasing the efficiency and flow capacity of the de-entrainment stage as well as the overall capacity and efficiency of the scrubber. The scrubbed air leaving the scrubber is almost completely dry.

In scrubber apparatus lacking the deflector cone 50 shown, for example, in FIGS. 2, 4b and 4c, drops will flip over the upper, outside edge E of the de-entrainer (see FIG. 2) and migrate inwardly to the top, center portion of the de-entrainer as shown by the dotted lines M representing the path of migrating drops.

The drops reaching the central portion are re-entrained with the gas leaving the scrubber. Since the drops carry particulate as well as other contaminants collected in the contact section (i.e. entrainer), this re-entrainment of drops adversely effects the efficiency of contaminant removal from the gas stream. By providing cone 50 on the top of the de-entrainer 17, drops attempting to migrate toward the top center of de-entrainer 17 are prevented from doing so and in addition are deflected downwardly and radially outwardly from the vertical centerline CL of the scrubber 10 where they are collected at C3 for recirculation and reuse.

The anti-spin plates 54 provided on the inner periphery of truncated conical portion 12d located just inside the outlet opening 12c at the top of de-entrainment tank 12, act to interfere with and break-up the vortex of air formed by the primary de-entrainer just prior to the air leaving scrubber 10. The anti-spin plates provide dual benefits due to the breaking of the vortex of air.

First, the plates form a means for removal of droplets and water vapor from the air by mechanical condensation and agglomeration of vapor and/or droplets upon the plates. As the drops agglomerate, their mass causes them to drop by gravity and return for collection to C3.

In addition, by removing drops and condensation in a low velocity area, there is less chance for the drops to entrain in the air and be carried out of the stack, which has a much higher velocity and hence contaminant removal efficiency is increased significantly.

Secondly, breaking the vortex of air reduces the pressure drop required to move the air out of the scrubber and into the atmosphere. By reducing the pressure drop in this area, the pressure can be utilized to greater advantage in the vane cage region of the entrainer 16, which leads to the creation of finer drops during entrainment. Finer drops improve scrubber contaminant removal efficiency and hence make the scrubber more efficient without any increase in power supply to the scrubber.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Mass contactor apparatus comprising:

an annular-shaped enclosure having an inlet for introducing gas into said enclosure;

entrainment means provided in said enclosure for deflecting air flowing into said inlet through open spaces provided in said entrainment means and into a hollow interior region of said entrainment means thereby creating a vortical flow of gas within said hollow interior region;

said entrainment means having an annular outlet enabling the vortical gas flow to move upwardly and out of a central region said entrainment means;

de-entrainment means positioned directly upon said entrainment means for deflecting vortical flow entering into an inlet of a central region of said said de-entrainment means surrounding the outlet of said entrainment means, radially outwardly through spaces provided between vertically aligned, curved deflection plates in said de-entrainment means to create an upward, outward circular flow along an interior surface of said enclosure;

a liquid source and means for delivering liquid from said liquid source to at least a hollow interior region of said entrainment means wherein the vortical gas flow draws the liquid into intimate contact therewith, causing the liquid to be accelerated and broken up into a cloud of droplets which tend to approach a velocity of and move in a direction of the vortical gas flow;

conical-shaped means positioned directly upon a top of and covering the top of said de-entrainment means causing droplets attempting to move radially inwardly and toward a top of the de-entrainment means to move downwardly along the conical surface thereof thereby preventing the drops from being re-entrained with upwardly flowing scrubbed gas in a central region of said enclosure.

2. The apparatus of claim 1 wherein said conical shaped means is a hollow conical shell having a base angle in the range from 10 to 40 degrees.

3. The apparatus of claim 1 wherein said conical-shaped means is a conical shell which has a base portion aligned with an outer, upper peripheral edge of said de-entrainment means.

4. Mass contactor apparatus comprising:

an enclosure having an inlet for introducing gas into said enclosure;

entrainment means provided in said enclosure for deflecting air flowing into said inlet through open spaces provided about an annular periphery in said entrainment means and into a hollow annular interior region of said entrainment means thereby creating a vortical flow of gas within said hollow interior region;

said entrainment means having an outlet end about an annular interior periphery enabling the vortical gas flow leaving the outlet end to move upwardly and out of said entrainment means;

de-entrainment means positioned directly upon a top of said entrainment means having vertically aligned, curved blades for deflecting vortical flow entering into an annular inlet arranged about an annular inner periphery of said de-entrainment means, outwardly through spaces provided in said de-entrainment means to create an upward, outward circular flow;

a liquid source and means for delivering liquid from said liquid source to at least a hollow interior region of said entrainment means wherein the vortical gas flow draws the liquid into intimate contact therewith, causing the liquid to be accelerated and broken up into a cloud of droplets which tend to approach a velocity of and move in a direction of the vortical gas flow;

said enclosure having an outlet for withdrawing gas from said enclosure into the atmosphere;

a plurality of anti-spin plates arranged at spaced intervals upstream of said outlet for breaking up a vortical flow along an interior periphery of said enclosure adjacent said outlet to prevent vapor and/or droplets from being re-entrained with scrubbed gas moving toward and through said outlet;

said enclosure being provided with a truncated conical section adjacent to and upstream relative to said outlet having a circular-shaped outlet opening at its free end;

said anti-spin plates being mounted upon an inner periphery of said truncated portion and extending radially inwardly and diagonally downward therefrom, innermost portions of said plates lying along a circle of a size substantially equal to a size of said circular-opening.

5. The apparatus of claim 4 wherein said anti-spin plates are formed of a suitable metallic material which promotes condensation of vapor and droplets thereon.

6. The apparatus of claim 4 wherein said anti-spin plates are arranged at equi-spaced intervals.

7. The apparatus of claim 4 wherein said plates are provided at 45° intervals.

8. The apparatus of claim 4 wherein said plates are rectangular-shaped.

9. Mass contactor apparatus comprising:

an enclosure having an inlet for introducing gas into said enclosure;

entrainment means provided in said enclosure for deflecting air flowing into said inlet through open spaces provided in said entrainment means and into a hollow interior region of said entrainment means thereby creating a vortical flow of gas within said hollow interior region;

said entrainment means having an outlet enabling the vortical gas flow to move upwardly and out of said entrainment means;

de-entrainment means positioned directly upon said entrainment means for deflecting vortical flow entering into an inlet of said de-entrainment means outwardly through spaces provided in said de-entrainment means to create an upward, outward circular flow;

a liquid source and means for delivering liquid from said liquid source to at least a hollow interior region of said entrainment means wherein the vortical gas flow draws the liquid into intimate contact therewith, causing the liquid to be accelerated and broken up into a cloud of droplets which tend to approach a velocity of and move in a direction of the vortical gas flow;

said enclosure having an outlet for withdrawing gas from said enclosure directly into the atmosphere; and a plurality of anti-spin plates arranged at spaced intervals upstream of said outlet for breaking up a vortical flow along an interior periphery of said enclosure adjacent said outlet to reduce a pressure drop adjacent said outlet and thereby increase a pressure drop in a region of said entrainment means thereby increasing entrainment efficiency of the entrainment means;

said enclosure being provided with a truncated conical section adjacent to and upstream relative to said outlet having a circular-shaped outlet opening at its free end;

said anti-spin plates being mounted upon an inner periphery of said truncated portion and extending radially inwardly and extending diagonally downward therefrom, innermost portions of said plates lying along a circle of a size substantially equal to a size of said circular-opening.

10. Mass contactor apparatus comprising:

an enclosure having an inlet for introducing gas into said enclosure;

entrainment means provided in said enclosure for deflecting air flowing into said inlet through open spaces provided in said entrainment means and into a hollow interior region of said entrainment means thereby creating a vortical flow of gas within said hollow interior region;

said entrainment means having an outlet enabling the vortical gas flow to move upwardly and out of said entrainment means;

de-entrainment means positioned above said entrainment means for deflecting vortical flow entering into an inlet of said de-entrainment means outwardly through spaces provided in said de-entrainment means to create an upward, outward circular flow;

a liquid source and means for delivering liquid from said liquid source to at least a hollow interior region of said entrainment means wherein the vortical gas flow draws the liquid into intimate contact therewith, causing the liquid to be accelerated and broken up into a cloud of droplets which tend to approach a velocity of and move in a direction of the vortical gas flow;

conical-shaped means positioned above said de-entrainment means to cause said droplets to be deflected downwardly along the conical surface thereof thereby preventing the drops from being re-entrained with upwardly flowing scrubbed gas in a central region of said enclosure;

said enclosure having an outlet for withdrawing gas from said enclosure directly into the atmosphere; and a plurality of anti-spin plates arranged at spaced intervals upstream of said outlet for breaking up a vortical flow along an interior periphery of said enclosure adjacent said outlet to prevent vapor and/or droplets from being re-entrained with scrubbed gas moving toward and through said outlet;

said enclosure being provided with a truncated conical section adjacent to and upstream relative to said outlet having a circular-shaped outlet opening at its free end;

said anti-spin plates being mounted upon an inner periphery of said truncated portion and extending radially inwardly and diagonally downward therefrom, innermost portions of said plates lying along a circle of a size substantially equal to a size of said circular-opening.

* * * * *